(12) United States Patent
Karpuska

(10) Patent No.: US 11,929,983 B1
(45) Date of Patent: Mar. 12, 2024

(54) ENABLING PARTIAL ACCESS TO A LOCAL AREA NETWORK VIA A MESHNET DEVICE

(71) Applicant: UAB 360 IT, Vilnius (LT)

(72) Inventor: Rytis Karpuska, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 18/200,509

(22) Filed: May 22, 2023

(51) Int. Cl.
- *H04L 45/74* (2022.01)
- *H04L 9/40* (2022.01)
- *H04L 12/28* (2006.01)
- *H04L 12/46* (2006.01)

(52) U.S. Cl.
CPC .......... *H04L 63/0236* (2013.01); *H04L 45/74* (2013.01); *H04L 63/0428* (2013.01)

(58) Field of Classification Search
None
See application file for complete search history.

(56) References Cited

U.S. PATENT DOCUMENTS

| | | | | |
|---|---|---|---|---|
| 7,940,784 | B2 * | 5/2011 | Elias | H04L 45/02 370/396 |
| 2008/0112362 | A1 * | 5/2008 | Korus | H04W 36/0033 370/331 |
| 2010/0260146 | A1 * | 10/2010 | Lu | H04L 12/4633 455/432.1 |
| 2014/0050208 | A1 * | 2/2014 | Annaluru | H04W 8/26 370/338 |
| 2015/0156815 | A1 * | 6/2015 | Pang | H04L 45/28 370/338 |
| 2016/0234112 | A1 * | 8/2016 | Anand | H04W 28/04 |
| 2019/0089550 | A1 * | 3/2019 | Rexach | E03C 1/057 |
| 2022/0173999 | A1 * | 6/2022 | Karmarkar | H04L 12/4633 |
| 2022/0303868 | A1 * | 9/2022 | Kuenzi | H04L 45/04 |

* cited by examiner

*Primary Examiner* — Duc T Duong
(74) *Attorney, Agent, or Firm* — The Pattani Law Group

(57) ABSTRACT

A first meshnet device in a mesh network, the first meshnet device configured to: determine a first range of first subnet IP addresses associated with a first LAN and a second range of second subnet IP addresses associated with a second LAN; determine a conflict that a first subnet IP address assigned to a first LAN device in the first LAN matches a second subnet IP address assigned to a second LAN device in the second LAN; map an association between an alternate IP address and the first subnet IP address; transmit, to a second meshnet device, the association between the alternate IP address and the first subnet IP address; and receive, from the second meshnet device, an initiation network packet to be transmitted to the first LAN device, the initiation network packet indicating the alternate IP address as a destination address is disclosed. Various other aspects are contemplated.

20 Claims, 8 Drawing Sheets

US 11,929,983 B1

ENABLING PARTIAL ACCESS TO A LOCAL AREA NETWORK VIA A MESHNET DEVICE

FIELD OF DISCLOSURE

Aspects of the present disclosure generally relate to communications in networks, and more particularly to enabling partial access to a local area network (LAN) via a meshnet device.

BACKGROUND

Users may rely on mesh networks (also referred to as "meshnets") to communicate (e.g., transmit and/or receive) data among a plurality of meshnet devices (e.g., user devices) via one or more Internet nodes (e.g., bridges, switches, infrastructure devices, etc.). In an example, a mesh network may include a plurality of meshnet devices communicatively coupled to each other directly or via the one or more Internet nodes. A mesh network in which all meshnet devices are communicatively coupled to each other may be referred to as a fully connected network. Data transmitted by a first meshnet device, from among the plurality of meshnet devices, may be routed over the Internet via the one or more Internet nodes to a second meshnet device from among the plurality of meshnet devices. Also, data transmitted by the first meshnet device may be routed to two or more meshnet devices from among the plurality of meshnet devices.

In a mesh network, the plurality of meshnet devices may cooperate with each other to enable communication of the data among the plurality of meshnet devices. In an example, one or more of the meshnet devices may participate in communication of the data. In this way, the mesh network may avoid relying on a given meshnet device for communication of the data. Some mesh networks may have the ability to dynamically self-organize and self-configure the plurality of meshnet devices. This ability may allow such mesh networks to enable dynamic distribution of workloads, particularly in the event that one or more meshnet devices should fail. Further, installation overhead may be reduced.

SUMMARY

In one aspect, the present disclosure contemplates a method in a mesh network including a first meshnet device in communication with a second meshnet device, the first meshnet device being connected to a first local area network (LAN), the method comprising: receiving, by the first meshnet device from the second meshnet device via a meshnet connection between the first meshnet device and the second meshnet device, an initiation network packet to be transmitted by the first meshnet device to a first LAN device connected to the LAN, the initiation network packet indicating a first subnet IP address as a destination address; comparing, by the first meshnet device, the first subnet IP address with a stored subnet IP address that is stored in a memory in correlation with the second meshnet device; and selectively transmitting, by the first meshnet device, the initiation network packet to the first LAN device based at least in part on a result of comparing the first subnet IP address with the stored subnet IP address.

In another aspect, the present disclosure contemplates a first meshnet device in communication with a second meshnet device in a mesh network, the first meshnet device being connected to a local area network (LAN) and comprising: a memory; and a processor communicatively coupled to the memory, the memory and the processor being configured to: receive, from the second meshnet device via a meshnet connection between the first meshnet device and the second meshnet device, an initiation network packet to be transmitted by the first meshnet device to a first LAN device connected to the LAN, the initiation network packet indicating a first subnet IP address as a destination address; compare the first subnet IP address with a stored subnet IP address that is stored in the memory in correlation with the second meshnet device; and selectively transmit the initiation network packet to the first LAN device based at least in part on a result of comparing the first subnet IP address with the stored subnet IP address.

In another aspect, the present disclosure contemplates a non-transitory computer-readable medium configured to store instructions, which when executed by a processor associated with a first meshnet device in communication with a second meshnet device in a mesh network, the first meshnet device being connected to a first local area network (LAN), configure the processor to: receive, from the second meshnet device via a meshnet connection between the first meshnet device and the second meshnet device, an initiation network packet to be transmitted by the first meshnet device to a first LAN device connected to the LAN, the initiation network packet indicating a first subnet IP address as a destination address; compare the first subnet IP address with a stored subnet IP address that is stored in the memory in correlation with the second meshnet device; and selectively transmit the initiation network packet to the first LAN device based at least in part on a result of comparing the first subnet IP address with the stored subnet IP address.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
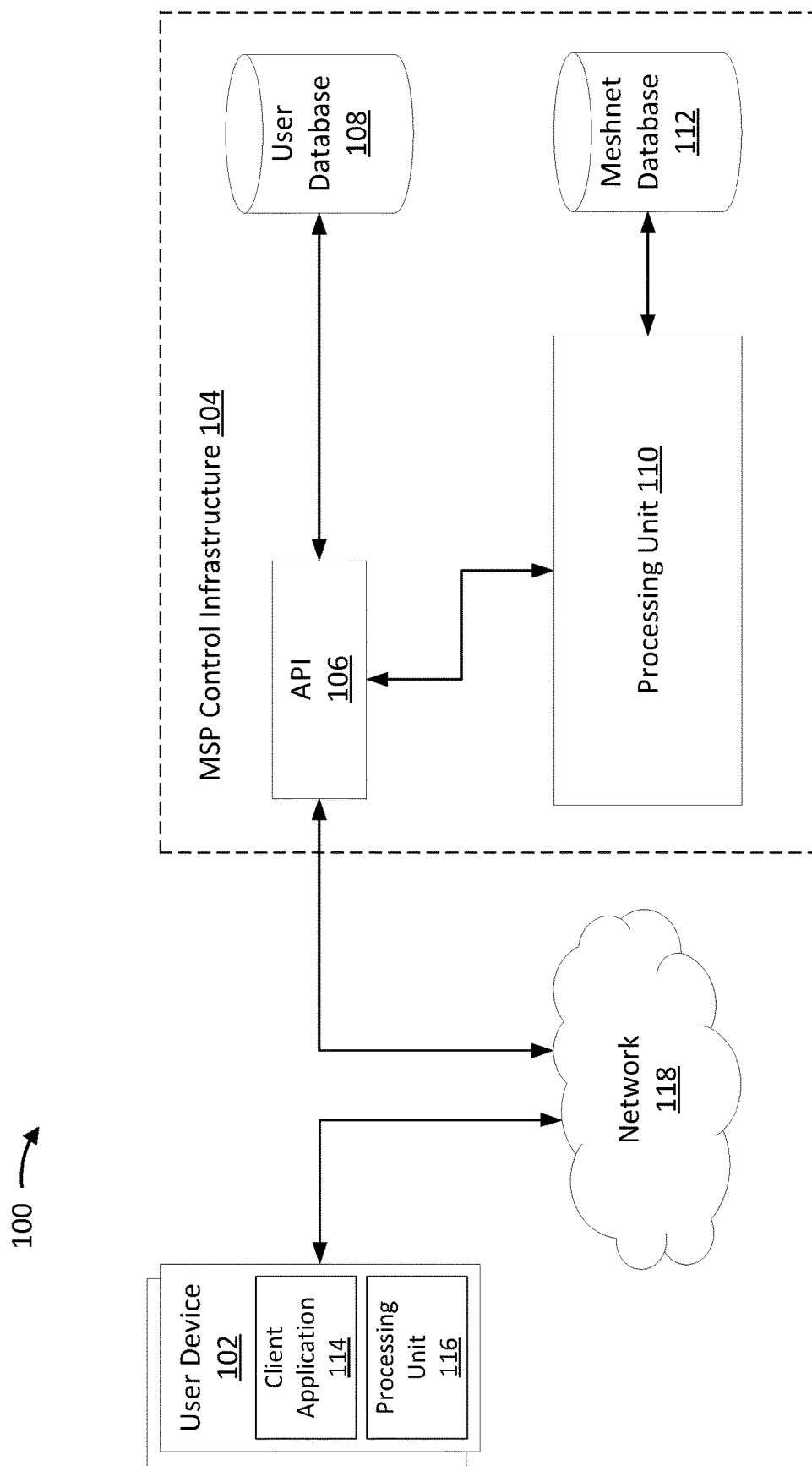

FIG. 1 is an illustration of an example system associated with enabling partial access to a LAN via a meshnet device, according to various aspects of the present disclosure.

Figure 2:
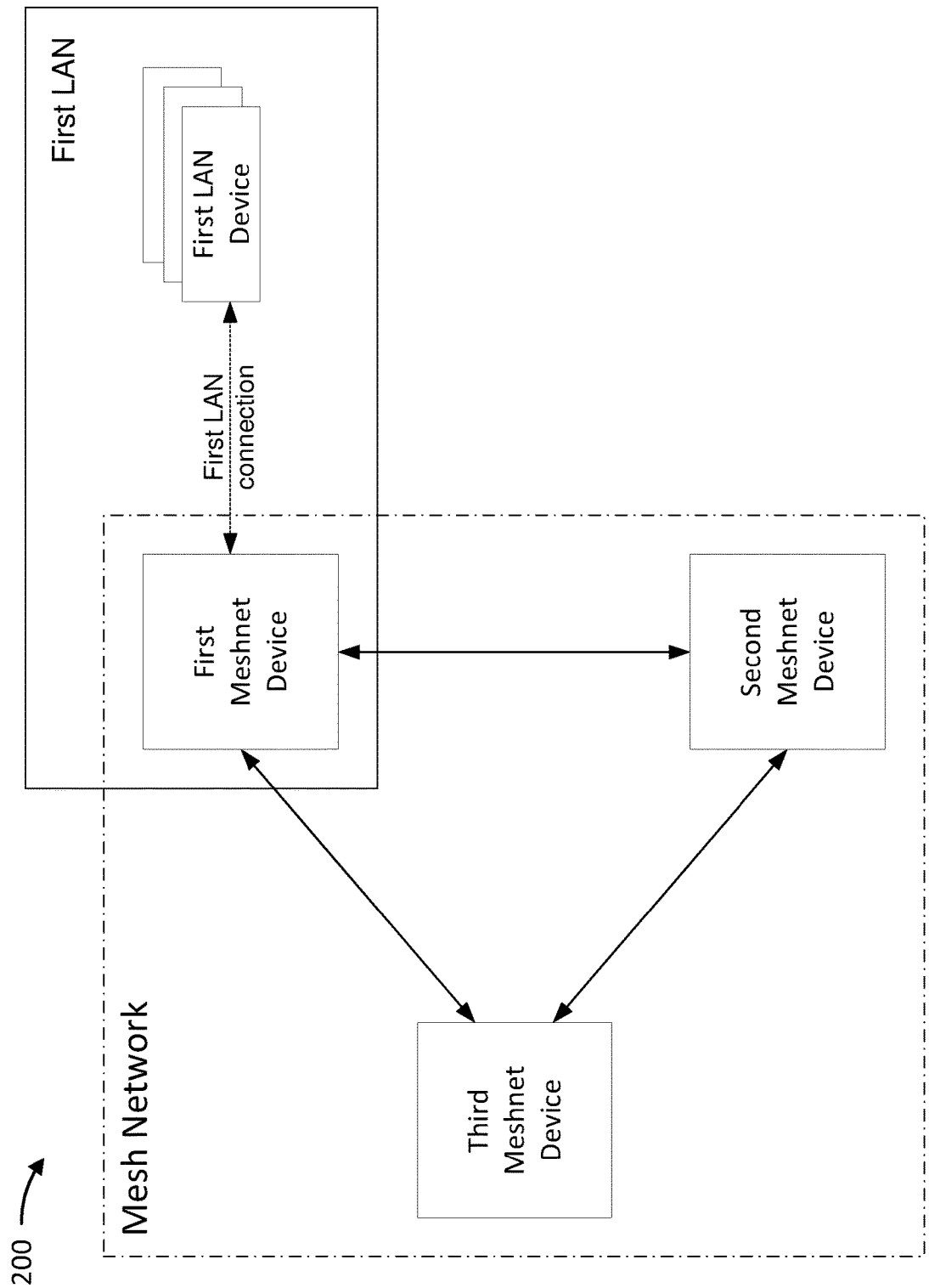

FIG. 2 is an illustration of an example associated with enabling partial access to a LAN via a meshnet device, according to various aspects of the present disclosure.

Figure 3:
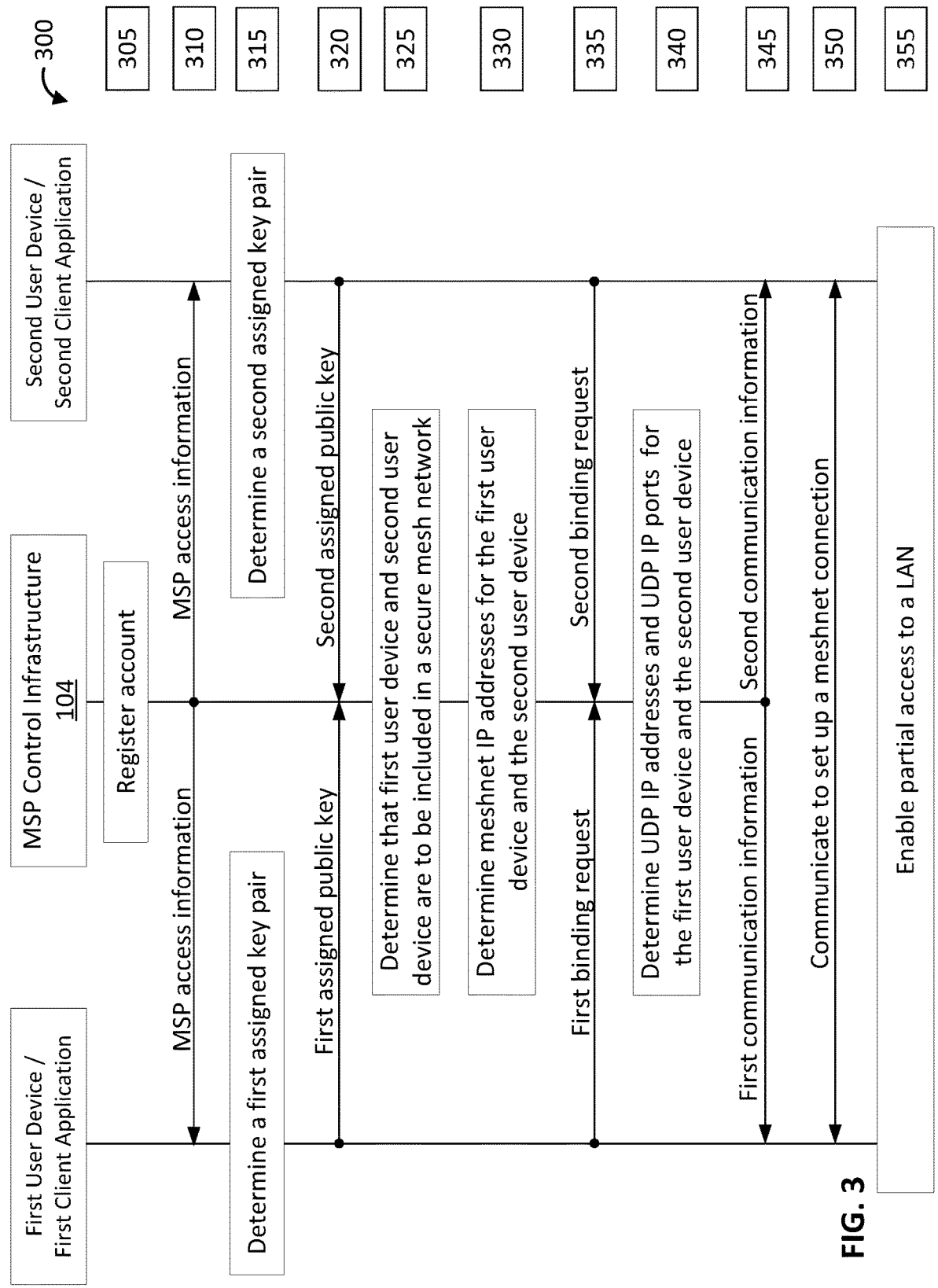

FIG. 3 is an illustration of an example flow associated with enabling partial access to a LAN via a meshnet device, according to various aspects of the present disclosure.

Figure 4:
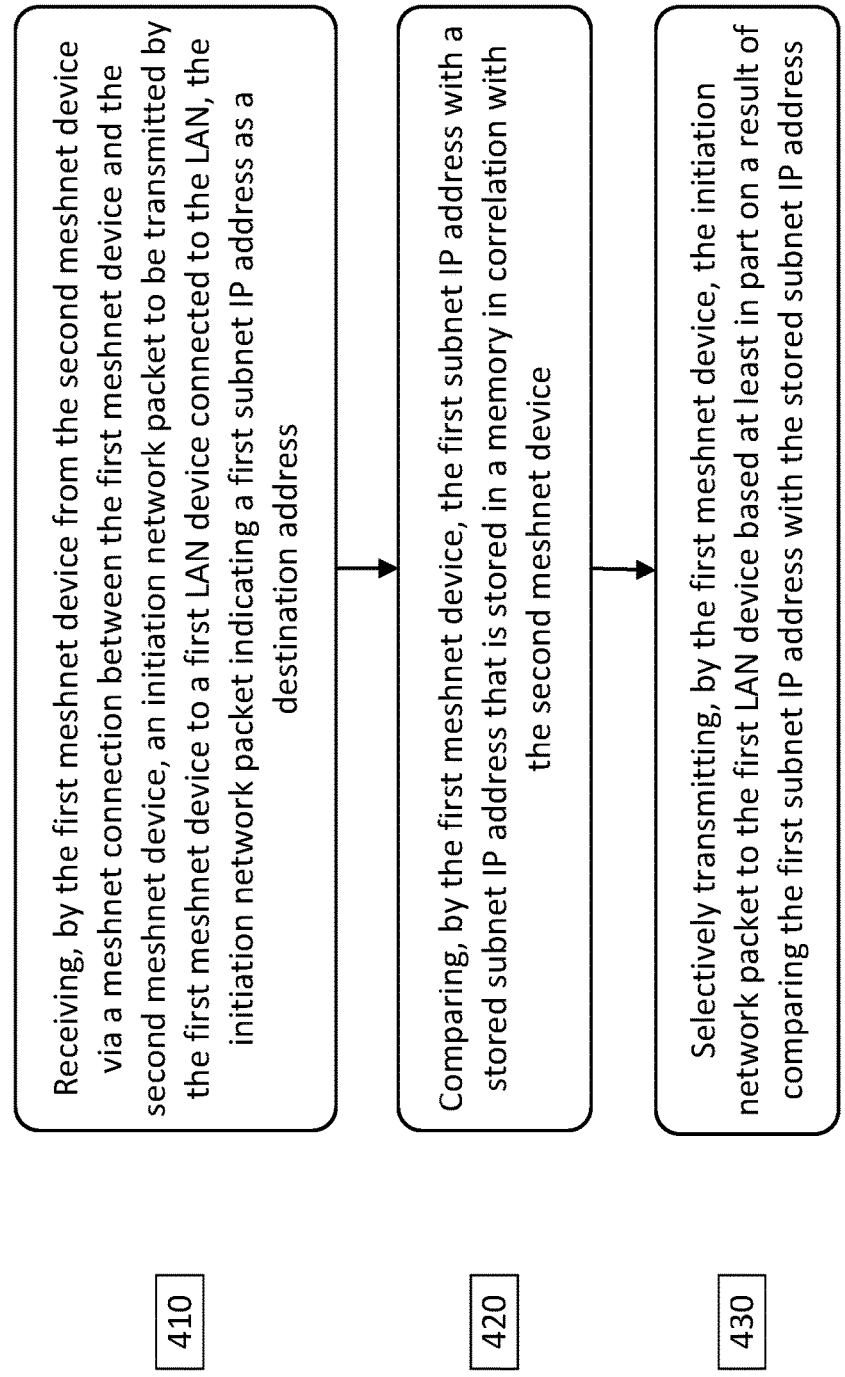

FIG. 4 is an illustration of an example process associated with enabling partial access to a LAN via a meshnet device, according to various aspects of the present disclosure.

Figure 5:
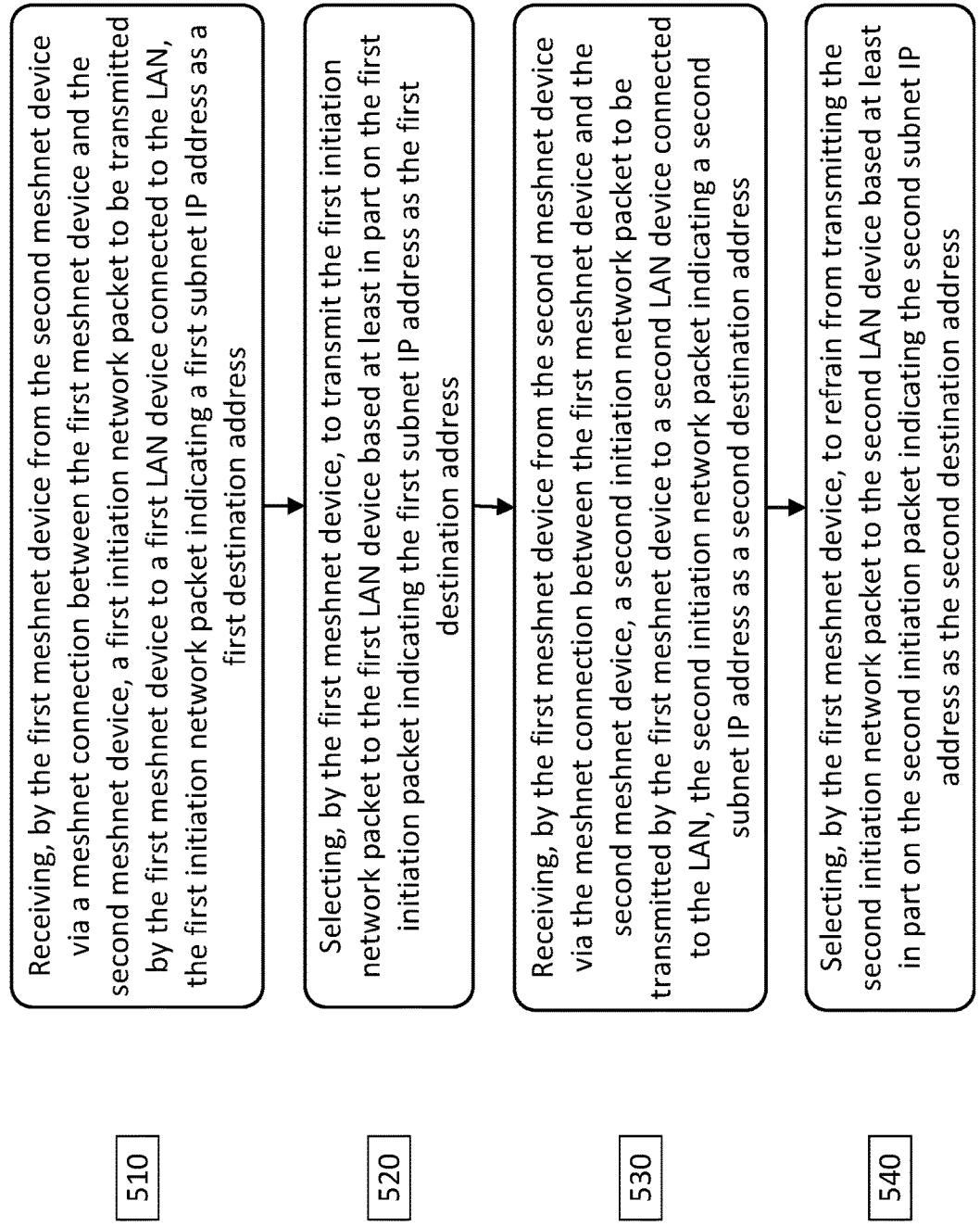

FIG. 5 is an illustration of an example process associated with enabling partial access to a LAN via a meshnet device, according to various aspects of the present disclosure.

Figure 6:
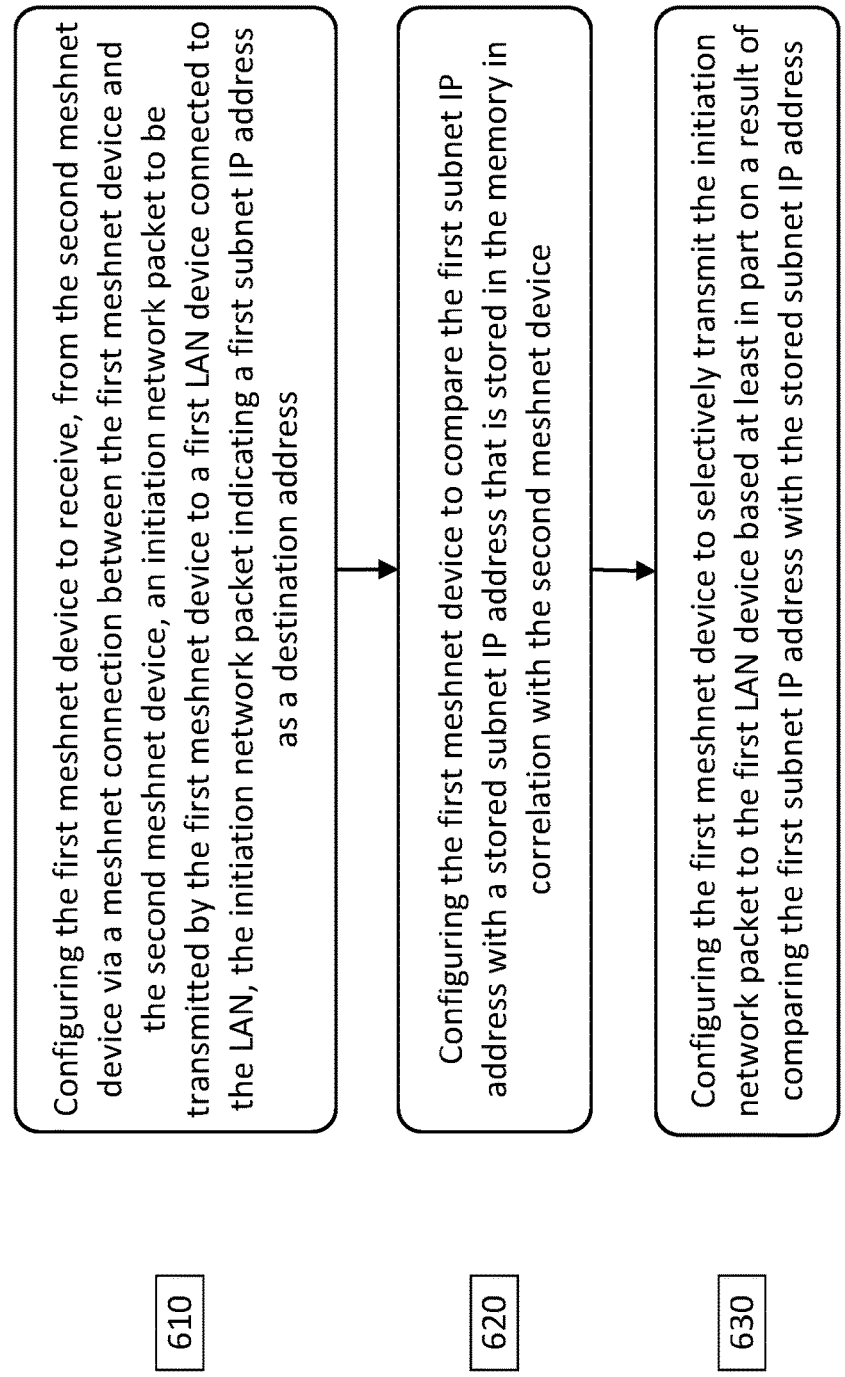

FIG. 6 is an illustration of an example process associated with enabling partial access to a LAN via a meshnet device, according to various aspects of the present disclosure.

Figure 7:
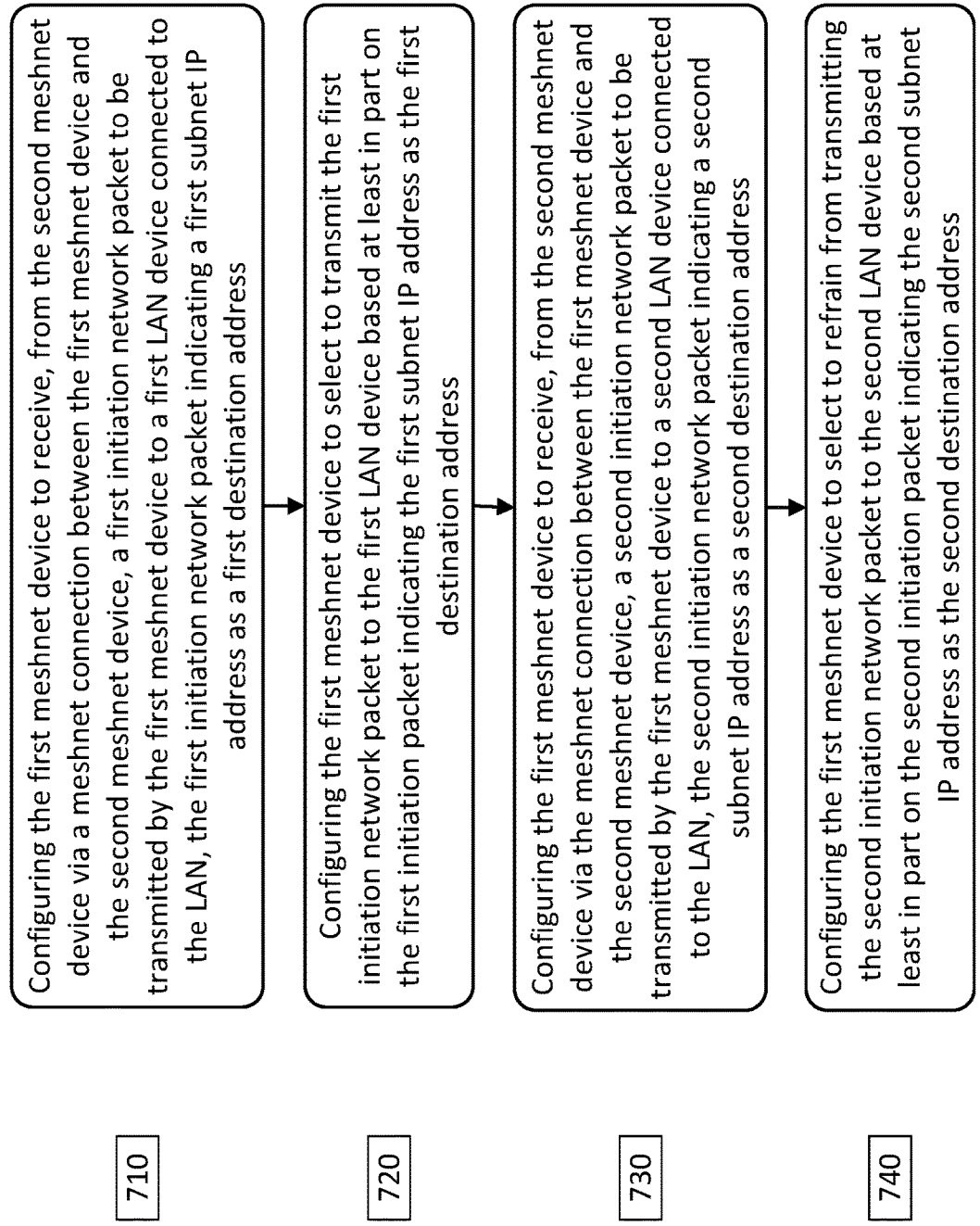

FIG. 7 is an illustration of an example process associated with enabling partial access to a LAN via a meshnet device, according to various aspects of the present disclosure.

Figure 8:
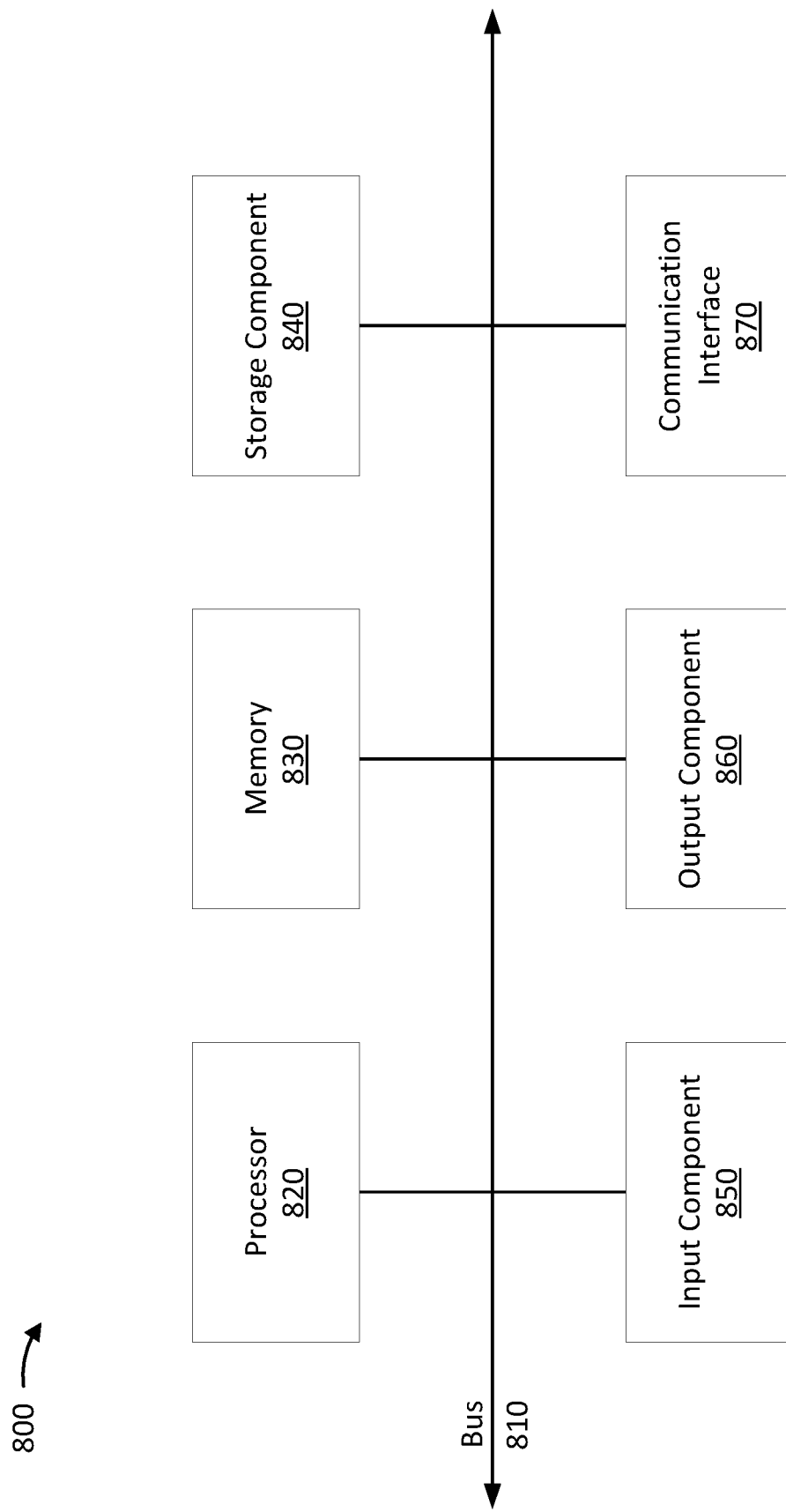

FIG. 8 is an illustration of example devices associated with enabling partial access to a LAN via a meshnet device, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with enabling partial access to a LAN via a meshnet device, according to various aspects of the present disclosure. Example 100 shows an architectural depiction of included components. In some aspects, the components may include one or more user devices 102 capable of communicating with a mesh network service provider (MSP) control infrastructure 104 for purposes of obtaining mesh network services. In some aspects, the one or more user devices 102 may communicate with the MSP control infrastructure 104 over a network 118. The MSP control infrastructure 104 may be controlled by a mesh network service provider and may include an application programming interface (API) 106, a user database 108, processing unit 110, and a meshnet database 112. In some aspects, a user device 102 may utilize a processing unit 116 and/or a client application 114, which may be provided by the MSP control infrastructure 104, to communicate with the API 106. The API 106 may be capable of communicating with the user database 108 and with the processing unit 110. Additionally, the processing unit 110 may be capable of communicating with the meshnet database 112, which may be capable of storing data associated with providing mesh network services.

The user device 102 may be a physical computing device capable of hosting the client application 114 and of connecting to the network 118. The user device 102 may be, for example, a laptop, a mobile phone, a tablet computer, a desktop computer, a smart device, a router, or the like. In some aspects, the user device 102 may include, for example, Internet-of-Things (IoT) devices such as MSP smart home appliances, smart home security systems, autonomous vehicles, smart health monitors, smart factory equipment, wireless inventory trackers, biometric cyber security scanners, or the like.

The MSP control infrastructure 104 may include a combination of hardware and software components that enable provision of mesh network services to the user device 102. The MSP control infrastructure 104 may interface with (the client application on) the user device 102 via the API 106, which may include one or more endpoints to a defined request-response message system. In some aspects, the API 106 may be configured to receive, via the network 118, a connection request from the user device 102 to establish a connection with the MSP control infrastructure 104 for purposes of obtaining the mesh network services. The connection request may include an authentication request to authenticate the user device 102 as a subscriber of the mesh network services. The API 106 may receive the authentication request and a request for the mesh network services in a single connection request. In some aspects, the API 106 may receive the authentication request and the request for the mesh network services in separate connection requests.

The API 106 may further be configured to handle the connection request by mediating the authentication request. For instance, the API 106 may receive from the user device 102 credentials including, for example, a unique combination of a user ID and password for authenticating the user device 102. In another example, the credentials may include a unique validation code known to an authorized user. The API 106 may provide the received credentials to the user database 108 for verification.

The user database 108 may include a structured repository of valid credentials belonging to authorized users. In one example, the structured repository may include one or more tables containing valid unique combinations of user IDs and passwords belonging to authorized users. In another example, the structured repository may include one or more tables containing valid unique validation codes associated with authentic users. The mesh network service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the mesh network service provider may provide mesh network services to the user device 102. When the received credentials fail to match at least one of the valid credentials, the user database 108 and the processor may fail to authenticate the user device 102. In this case, the mesh network service provider may decline to provide mesh network services to the user device 102.

When the user device 102 is authenticated, the user device 102 may initiate a connection and may transmit to the API

106 another connection request for the mesh network services. The processing unit 110 included in the MSP control infrastructure 104 may be configured to determine a mesh network associated with the user device 102 and/or to identify one or more user devices to be included within the determined mesh network. The processing unit 110 may utilize the API 106 to transmit information associated with the mesh network and/or the identified one or more user devices to the user device 102. The user device 102 may transmit an initiation request to establish secure connections (e.g., encrypted tunnels) with the one or more user devices. In some aspects, the one or more user devices with which the user device 102 establishes the secure connections may also host respective client applications for communicating with the MSP control infrastructure 104 and/or with the user device 102. In some aspects, the processing unit 110 may be a logical unit including a logical component configured to perform complex operations associated with computing, for example, numerical weights related to various factors associated with providing the meshnet services.

One or more components (e.g., API 106, user database 108, processing unit 110, and/or meshnet database 112, processing unit 116) included in the MSP control infrastructure 104 and/or included in the user device 102 may further be associated with a controller/processor, a memory, a communication interface, or a combination thereof (e.g., FIG. 8). For instance, the one or more components may include or may be included in a controller/processor, a memory, or a combination thereof. In some aspects, the one or more components may be separate and distinct from each other. Alternatively, in some aspects, the one or more components may be combined with another one of the one or more components. In some aspects, the one or more may be local with respect to each other. Alternatively, in some aspects, the one or more components may be located remotely with another one of the one or more components. Additionally, or alternatively, the one or more components may be implemented at least in part as software stored in a hardware memory. For example, a component (or a portion of a component) may be implemented as instructions or code stored in a non-transitory computer-readable medium and executable by a controller or a processor to perform the functions or operations of the component. Additionally, or alternatively, the one or more components shown in FIG. 1 may be configured to perform one or more functions described as being performed by another one of the one or more components shown in FIG. 1.

As indicated above, FIG. 1 is provided as an example. Other examples may differ from what is described with regard to FIG. 1.

User devices (e.g., meshnet devices) may be included in a mesh network and may rely on the mesh network to communicate (e.g., transmit and/or receive) meshnet data with each other. In example 200 shown in FIG. 2, the meshnet devices may include a first user device, a second user device, and a third user device. The meshnet data may be communicated over a wired network and/or a wireless network. The meshnet data may include information including digital information such as, for example, documents including data, voice data, image data, signal data, and/or video data. Further, the mesh network may be a secure mesh network that may enable the meshnet devices to communicate the meshnet data in encrypted form via meshnet connections (shown as double-ended arrows in FIG. 2).

In some cases, a meshnet device (e.g., first meshnet device) may be associated with a LAN (e.g., home network, business network, government networks, data center networks, IoT networks, virtual networks (e.g., virtualization or containerization networks), automotive networks, etc.), which may also include one or more first LAN devices such as, for example, smart home devices, office devices such as printers, copiers, etc. To enable communication among the devices connected to the LAN, the LAN may respectively assign subnet IP addresses to each device connected to the LAN. The LAN may freely select a range of subnet IP addresses from a pool of subnet IP addresses reserved for use by LANs. In this case, the first meshnet device may communicate (e.g., transmit and/or receive information) with a first LAN device over a first LAN connection between the first meshnet device and the first LAN device. For instance, the first meshnet device may utilize a respective subnet IP address assigned to the meshnet device and a respective subnet IP address assigned to the first LAN device to communicate with the first LAN device.

An external meshnet device disconnected from the LAN (e.g., second meshnet device, third meshnet device, etc.) may not have an assigned respective subnet IP address. As a result, the external meshnet device may not be able to communicate with the first LAN device. Additionally, the first meshnet device may be unable to utilize a subnet IP address assigned to the first LAN device because subnet IP addresses may change over time and the previously utilized subnet IP address may not be currently assigned to the first LAN device.

When the external meshnet device is to communicate with the first LAN device, the external meshnet device may attempt to utilize the first meshnet device to communicate with the first LAN device. However, the first meshnet device may not enable the external meshnet device to communicate with the first LAN device unless the external meshnet device has full access to the LAN. In other words, unless the external meshnet device is permitted to communicate with each LAN device in the LAN, the first meshnet device may not enable the external meshnet device to have partial access to the external meshnet device (e.g., communicate with a subset of the LAN devices in the LAN).

Because the first meshnet device may not enable the external meshnet device to communicate with the first LAN device, the external meshnet device may be unable to adequately perform essential functions. In an example, the external meshnet device may be unable to adequately monitor and/or control functions performed by a smart home device in a home LAN. In another example, the external meshnet device may be unable to adequately monitor and/or control functions performed by an office resource and/or device in a business LAN. In some aspects, as noted above, the first meshnet device may not enable the external meshnet device to communicate with a subset of the LAN devices in the LAN without the external meshnet device having, for example, a layer 1 connection to the LAN.

In these cases, enabling the external meshnet device to communicate with the first LAN device may be difficult and may inefficiently consume user device resources (e.g., processing power, memory consumption, battery life, or the like) and meshnet and/or LAN resources (e.g., management resources, bandwidth, processing power, memory consumption, or the like) that may be otherwise efficiently utilized to perform tasks associated with the LAN. Additionally, a delay may be introduced in monitoring and/or controlling the functions associated with the LAN.

Various aspects of systems and techniques discussed in the present disclosure enable partial (or full) access to a LAN via a meshnet device. In some aspects, an MSP control infrastructure may provide the mesh network to enable meshnet devices to securely communicate meshnet data. Further, the MSP control infrastructure may provide the meshnet devices with respective client applications to communicate with the MSP control infrastructure, to communicate with each other for setting up respective meshnet connections to be utilized for communicating meshnet data in the mesh network, and/or to communicate the meshnet data with each other over the respective meshnet connections. The MSP control infrastructure and the respective client applications may also enable partial (or full) access to a LAN via a meshnet device.

In an example, a first meshnet device that is connected to a LAN may receive access information from the MSP control infrastructure indicating a level of access to be provided by the first meshnet device to an external meshnet device (e.g., the second meshnet device, the third meshnet device, etc.) with respect to communicating with a LAN device connected to the LAN. In some aspects, the access information may indicate that the external meshnet device has full access to the LAN. In this case, the first meshnet device may enable the external meshnet device to communicate with all LAN devices connected to the LAN. In some aspects, the access information may indicate that the external meshnet device has partial access to the LAN. Further, the access information may indicate one or more subnet IP addresses and/or LAN devices with which the external meshnet device may (or may not) communicate. In this case, the first meshnet device may enable the external meshnet device to communicate with the one or more LAN devices while preventing the external meshnet device from communicating with a remainder of LAN devices connected to the LAN. In this way, by enabling partial (or full) access to an external meshnet device, the first meshnet device may avoid difficulty and/or inefficiency in enabling the external meshnet device to have partial access to the LAN without the external meshnet device having, for example, a layer 1 connection to the LAN. As a result, efficient utilization of meshnet device resources (e.g., processing power, memory consumption, battery life, or the like) and meshnet and/or LAN resources (e.g., management resources, bandwidth, processing power, memory consumption, or the like) for performing suitable tasks associated with the mesh network and/or the LAN may be enabled. Also, a delay in communication between the external meshnet device and the one or more LAN devices may be avoided.

In some aspects, a processor (e.g., processing unit 116, processor 720) associated with an external meshnet device may receive, from the second meshnet device via a meshnet connection between the first meshnet device and the second meshnet device, an initiation network packet to be transmitted by the first meshnet device to a first LAN device connected to the LAN, the initiation network packet indicating a first subnet IP address as a destination address; compare the first subnet IP address with a stored subnet IP address that is stored in the memory in correlation with the second meshnet device; and selectively transmit the initiation network packet to the first LAN device based at least in part on a result of comparing the first subnet IP address with the stored subnet IP address.

As indicated above, FIG. 2 is provided as an example. Other examples may differ from what is described with regard to FIG. 2.

FIG. 3 is an illustration of an example flow 300 associated with enabling partial access to a LAN via a meshnet device, according to various aspects of the present disclosure. The example flow 300 may include a first user device (e.g., first meshnet device), MSP control infrastructure 104, and a second user device (e.g., second meshnet device) in communication with each other. The first user device and the second user device may be similar to a user device 102 discussed above with respect to FIG. 1 and/or FIG. 2. In some aspects, the first meshnet device and the second meshnet device may be associated with a single account registered with the MSP control infrastructure 104. In some aspects, the first meshnet device and the second meshnet device may be associated with different accounts registered with the MSP control infrastructure 104. In some aspects, the first meshnet device and the second meshnet device may be located locally (e.g., in the same room, in the same building, etc.). In some aspects, the first meshnet device and the second meshnet device may be located remotely (e.g., in different buildings, in different cities, in different states, in different countries, etc.) with respect to each other.

The first meshnet device may install a first client application (e.g., client application 104) and the second meshnet device may install a second client application (e.g., client application 104), the first client application and the second client application being associated with (e.g., provided by) the MSP control infrastructure 104. The first meshnet device and the second meshnet device may use the respective client applications to communicate with an application programming interface (API) and/or a processor (e.g., processing unit 110, processor 820) associated with the MSP control infrastructure 104. In some aspects, the first meshnet device, the MSP control infrastructure 104, and the second meshnet device may communicate with each other over a network (e.g., network 118). As discussed elsewhere herein, the MSP control infrastructure 104 may enable the first meshnet device and/or the second meshnet device to obtain the mesh network services.

In some aspects, the client applications may enable the user devices to receive information to be processed by the client applications and/or by the MSP control infrastructure 104. Each of the client applications may include respective graphical user interfaces and/or command line interfaces (CLIs) to receive the information via local input interfaces (e.g., touch screen, keyboard, mouse, pointer, etc.) associated with the user devices. The information may be received via text input or via a selection from among a plurality of options (e.g., pull down menu, etc.). In some aspects, the first client application and/or the second client application may activate and/or enable, at a time associated with the registration (e.g., after the registration), the graphical interface for receiving the information. For instance, the first client application (or the second client application) may cause a screen (e.g., local screen) associated with the first meshnet device (or the second meshnet device) to display, for example, a pop-up message to request entry of the information. Further, the client applications may enable transmission of at least a portion of the information to the MSP control infrastructure 104. In some aspects, the first client application may utilize a first processing unit (e.g., processing unit 116, processor 820) associated with the first meshnet device to perform processes/operations associated with enabling partial access and the second application may utilize a second processing unit (e.g., processing unit 116, processor 820) associated with the second meshnet device to perform processes/operations associated with enabling partial access.

Although only two user devices (e.g., meshnet devices) are shown in FIG. 3, the present disclosure contemplates the mesh network to include any number of user devices that perform the processes discussed herein in a similar and/or analogous manner. For instance, the mesh network may include a third meshnet device and a fourth meshnet device, as discussed above with respect to FIG. 2, that perform the processes discussed herein in a similar and/or analogous manner. Further, user devices may leave or join the mesh network in an ad-hoc manner.

As shown by reference numeral 305, the MSP control infrastructure 104 may register an account. In some aspects, the account may be registered with the MSP control infrastructure 104 by a registering device associated with the first meshnet device and/or the second meshnet device. In some aspects, the account may be set up by the first meshnet device or by the second meshnet device. During registration, registration information such as, for example, identities of owners of the first meshnet device and the second meshnet device, phone numbers associated with the first meshnet device and the second meshnet device, email addresses associated with the first meshnet device and the second meshnet device, or the like may be provided to the MSP control infrastructure 104. In some aspects, the registering device may set up an access system including login information (e.g., access information) such as, for example, username, password, or the like to subsequently gain access to the registered account. In some aspects, the registering device may share the login information with associated user devices (e.g., first meshnet device, second meshnet device, etc.) to enable the associated user devices to utilize the login information to gain access to the MSP control infrastructure 104 via the registered account. In some aspects, a given user device may be an associated user device because the given user device may be available to a user/owner of the registering device.

In some aspects, the registration information may also include access information associated with providing the second meshnet device with partial (or full) access to a LAN to which the first meshnet device is connected. In an example, the registration information may indicate to the MSP control infrastructure 104 that the first meshnet device is connected to a LAN, which may include a plurality of LAN devices. Further, the registration information may indicate that the first meshnet device is to enable the second meshnet device to access the LAN. In some aspects, the registration information may indicate that the first meshnet device is to enable the second meshnet device to have full access to the LAN. In this case, the first meshnet device may enable the second meshnet device to communicate with each of the plurality of LAN devices.

In some aspects, the registration information may indicate that the first meshnet device is to enable the second meshnet device to have partial (or full) access to the LAN. Further, the access information may indicate one or more LAN devices with which the second meshnet device may communicate. The one or more LAN devices may be indicated via, for example, one or more respective subnet IP addresses assigned to the one or more LAN devices by the LAN. In this case, the first meshnet device may enable the second meshnet device to communicate with only the one or more LAN devices from among the plurality of LAN devices.

In some aspects, the first meshnet device and the second meshnet device may utilize the login information to access the registered account/accounts to communicate with the MSP control infrastructure 104. As shown by reference numeral 310, based at least in part on the first meshnet device and the second meshnet device accessing the registered account/accounts to communicate with the MSP control infrastructure 104, the MSP control infrastructure 104 may transmit, and the first meshnet device and the second meshnet device may receive, MSP access information. In some aspects, the MSP access information may include UDP access information. The UDP access information may include information regarding an infrastructure UDP IP address and an infrastructure UDP port associated with the MSP control infrastructure 104. The MSP control infrastructure 104 may utilize the infrastructure UDP IP address and the infrastructure UDP port to communicate utilizing the UDP. In some aspects, the first meshnet device and the second meshnet device may utilize the infrastructure UDP IP address and the infrastructure UDP port to communicate with the MSP control infrastructure 104 regarding the mesh network. Further, the first meshnet device and the second meshnet device may obtain from, for example, a domain name services (DNS) server, transmission control protocol (TCP) access information associated with the MSP control infrastructure 104. Such TCP access information may include information regarding an infrastructure TCP IP address and an infrastructure TCP port associated with the MSP control infrastructure 104. The MSP control infrastructure 104 may utilize the infrastructure TCP IP address and the infrastructure TCP port to communicate utilizing the TCP.

As shown by reference numeral 315, the first meshnet device and the second meshnet device may determine information based at least in part on the registration of the account with the MSP Control Infrastructure 104. In an example, the first meshnet device may determine an asymmetric first assigned key pair associated with the first meshnet device. The first assigned key pair may be unique to the first meshnet device and may include a first assigned public key and a first assigned private key. In this way, the first assigned public key and the first assigned private key may be device-specific and maybe associated with the registered account. In some aspects, the first assigned public key and the first assigned private key may be associated with each other via, for example, a mathematical function. As a result, data encrypted using the first assigned public key may be decrypted by utilizing the first assigned private key.

Similarly, the second meshnet device may determine an asymmetric second assigned key pair associated with the second meshnet device. The second assigned key pair may be unique to the second meshnet device and may include a second assigned public key and a second assigned private key. In this way, the second assigned public key and the second assigned private key may be device-specific and maybe associated with the registered account. In some aspects, the second assigned public key and the second assigned private key may be associated with each other via, for example, a mathematical function. As a result, data encrypted using the second assigned public key may be decrypted by utilizing the second assigned private key.

As shown by reference numeral 320, the first meshnet device and the second meshnet device may transmit, and the MSP control infrastructure 104 may receive, at least a portion of the information determined by the first meshnet device and the second meshnet device. For instance, the first meshnet device may transmit, for example, the first assigned public key to the MSP control infrastructure 104 and the second meshnet device may transmit, for example, the second assigned public key to the MSP control infrastructure 104. The MSP control infrastructure 104 may store and correlate the received information in association with the registered account and/or with the respective meshnet devices. In an example, the MSP control infrastructure 104 may store and correlate the first assigned public key in association with the registered account and the first meshnet device, and may store and correlate the second assigned public key in association with the registered account and the second meshnet device. In some aspects, the first meshnet device and the second meshnet device may utilize the infrastructure TCP IP address and the infrastructure TCP port to transmit the first assigned public key and the second assigned public key to the MSP control infrastructure 104 via the TCP.

Further, as shown by reference numeral 325, the MSP control infrastructure 104 may determine that the first meshnet device and the second meshnet device are to be included in the same mesh network. In some aspects, when the first meshnet device and the second meshnet device are associated with the same registered account, the MSP control infrastructure 104 may make such a determination regarding the secure mesh network based at least in part on determining that the first meshnet device and the second meshnet device are communicating with the MSP control infrastructure 104 by utilizing the login information associated with the same registered account. In some aspects, the MSP control infrastructure 104 may make such a determination regarding the secure mesh network based at least in part on the first meshnet device (and/or the second meshnet device) providing information indicating that the first meshnet device and the second meshnet device are to be included in the same mesh network. Such information may include, for example, identification information (e.g., type of device, user name, email address, etc.) associated with the second meshnet device (or the first meshnet device), the second IP address (or the first IP address), or the like.

Based at least in part on determining that the first meshnet device and the second meshnet device are to be included in the same mesh network, as shown by reference numeral 330, the MSP control infrastructure 104 may determine meshnet IP addresses for the first meshnet device and for the second meshnet device. In an example, the MSP control infrastructure 104 may determine a first meshnet IP address associated with the first meshnet device and a second meshnet IP address associated with the second meshnet device. The first meshnet device and/or another application installed on the first meshnet device and/or the operating system associated with the first meshnet device may utilize the first meshnet IP address and/or first local meshnet ports to communicate meshnet data with other meshnet devices over respective meshnet connections in the mesh network and the second meshnet device may utilize the second meshnet IP address and/or second local meshnet ports to communicate meshnet data with other meshnet devices over respective meshnet connections in the mesh network. In an example, with respect to communication between the first meshnet device and the second meshnet device, the first meshnet device may determine a first meshnet IP packet indicating the first meshnet IP address as a source address, the first local meshnet port as a source port, the second meshnet IP address as a destination address, and the second local meshnet port as a destination port. The first meshnet device may encrypt the first meshnet IP packet for transmission over a meshnet connection between the first meshnet device and the second meshnet device. The second meshnet device may receive and decrypt the first meshnet IP packet, and may route the first meshnet IP packet to the second local meshnet port (for routing to a destination application (e.g., meshnet application, third-party application, etc.) in the application layer of a network stack associated with the second meshnet device). Similarly, the second meshnet device may determine a second meshnet IP packet indicating the second meshnet IP address as a source address, the second local meshnet port as a source port, the first meshnet IP address as a destination address, and the first local meshnet port as a destination port. The second meshnet device may encrypt the second meshnet IP packet for transmission over the meshnet connection between the first meshnet device and the second meshnet device. The first meshnet device may receive and decrypt the first meshnet IP packet, and may route the second meshnet IP packet to the first local meshnet port (for routing to a destination application (e.g., meshnet application, third-party application, etc.) in the application layer of a network stack associated with the first meshnet device). The MSP control infrastructure 104 may determine the first meshnet IP address and the second meshnet IP address from, for example, a pool of reserved IP addresses included in a subnet associated with internal networks of the ISP.

As shown by reference numeral 335, the first meshnet device and the second meshnet device may transmit, and the MSP control infrastructure 104 may receive, respective binding requests. In some aspects, the first meshnet device may transmit the first binding request to the MSP control infrastructure 104 using the UDP by utilizing the UDP access information received from the MSP control infrastructure 104 (e.g., block 310). In this case, the first meshnet device may transmit a first binding request to the MSP control infrastructure 104 to request the MSP control infrastructure 104 to determine a first public UDP IP address (e.g., communication address) and/or a first public UDP port (e.g., communication port) associated with the first meshnet device. As discussed below in further detail, the first public UDP IP address and/or the first public UDP port are to be utilized by the second meshnet device to communicate with the first meshnet device in the mesh network. Similarly, the second meshnet device may transmit the second binding request to the MSP control infrastructure 104 using the UDP by utilizing the UDP access information received from the MSP control infrastructure 104 (e.g., block 310). In this case, the second meshnet device may transmit a second binding request to the MSP control infrastructure 104 to request the MSP control infrastructure 104 to determine a second public UDP IP address (e.g., communication address) and/or a second public UDP port (e.g., communication port) associated with the second meshnet device. As discussed below in further detail, the second UDP IP address and/or the second UDP port are to be utilized by the first meshnet device to communicate with the second meshnet device in the mesh network.

In some aspects, the first public UDP IP address and/or the first public UDP port may be determined by a first NAT device (e.g., a router) responsible for managing operation of the first meshnet device in a first local network. In an example, the first NAT device may translate a first local UDP IP address and/or a first local UDP port associated with the first meshnet device to the first public UDP IP address and/or the first public UDP port that the first meshnet device utilizes to communicate (e.g., transmit and/or receive) over the Internet using the UDP. Similarly, the second public UDP IP address and/or the second public UDP port may be determined by a second NAT device responsible for managing operation of the second meshnet device in a second local network. In an example, the second NAT device may translate a second local UDP IP address and/or a second local UDP port associated with the second meshnet device to the second public UDP IP address and/or the second public UDP port that the second meshnet device utilized to communicate (e.g., transmit and/or receive) over the Internet using the UDP.

Based at least in part on receiving the respective binding requests, as shown by reference numeral 340, the MSP control infrastructure 104 may determine public UDP IP addresses and/or public UDP ports associated with the first meshnet device and the second meshnet device. In an example, based at least in part on receiving the first binding request, the MSP control infrastructure 104 may determine the first public UDP IP address and/or the first public UDP port associated with the first meshnet device. In some aspects, the MSP control infrastructure 104 may determine the first public UDP IP address and/or the first public UDP port based at least in part on analyzing the UDP communication (e.g., UDP IP packet) including the first binding request received from the first meshnet device. The UDP communication may include, for example, a header that indicates the first public UDP IP address as a source UDP IP address and/or the first public UDP port as a source UDP port associated with the first meshnet device. Further, the MSP control infrastructure 104 may store and correlate the first public UDP IP address and/or the first UDP port in association with the first meshnet device in, for example, the meshnet database 112. Similarly, based at least in part on receiving the second binding request, the MSP control infrastructure 104 may determine the second public UDP IP address and/or the second public UDP port associated with the second meshnet device. In some aspects, the MSP control infrastructure 104 may determine the second public UDP IP address and/or the second public UDP port based at least in part on analyzing the UDP communication (e.g., UDP IP packet) including the second binding request received from the second meshnet device. The UDP communication may include, for example, a header that indicates the second public UDP IP address as a source UDP IP address and/or the second public UDP port as a source UDP port associated with the second meshnet device. Further, the MSP control infrastructure 104 may store and correlate the second public UDP IP address and/or the second public UDP port in association with the second meshnet device in, for example, the meshnet database 112.

Based at least in part on determining the public UDP IP addresses and/or the public UDP ports, as shown by reference numeral 345, the MSP control infrastructure 104 may transmit, and the first meshnet device and the second meshnet device may receive, communication information. In an example, the MSP control infrastructure 104 may transmit, and the first meshnet device may receive, first communication information including the first meshnet IP address associated with the first meshnet device, the second meshnet IP address associated with the second meshnet device, the second public UDP IP address and/or the second public UDP port associated with the second meshnet device, and the second public key associated with the second meshnet device.

Additionally, the first communication information may include at least a portion of the access information received during registration. In an example, the first communication information may include access information indicating that the first meshnet device is to enable the second meshnet device to have partial access to the LAN. Further, the access information may indicate one or more LAN devices with which the second meshnet device may communicate. The one or more LAN devices may be indicated via, for example, one or more respective subnet IP addresses assigned to the one or more LAN devices by the LAN. For instance, the access information may include a first subnet IP address assigned to a first LAN device by the LAN to indicate that the first meshnet device is to enable the second meshnet device to communicate with the first LAN device. In this case, as discussed in further detail below, the first meshnet device may utilize the first subnet IP address to enable the second meshnet device to communicate with only the first LAN device from among the plurality LAN devices.

Similarly, the MSP control infrastructure 104 may transmit, and the second meshnet device may receive, second communication information including the first public UDP IP address and/or the first public UDP port associated with the first meshnet device, the first public key associated with the first meshnet device, the first meshnet IP address associated with the first meshnet device, and the second meshnet IP address associated with the second meshnet device. As discussed below in further detail, the above transmission of communication information may enable the first meshnet device and the second meshnet device to communicate securely and privately in the mesh network.

As shown by reference numeral 350, the first meshnet device and the second meshnet device may communicate with each other directly to set up a meshnet connection (e.g., an encrypted tunnel) for communicating encrypted data in the mesh network. To set up the meshnet connection, the first meshnet device may utilize the second assigned public key and/or the second public IP address (e.g., second UDP IP address) to securely (e.g., in encrypted form) communicate with the second meshnet device, and the second meshnet device may utilize the first assigned public key and/or the first public IP address (e.g., first UDP IP address) to securely communicate with the first meshnet device. In some aspects, the first meshnet device and the second meshnet device may communicate to securely/privately negotiate parameters (e.g., a symmetric encryption/decryption key) associated with the meshnet connection. In some aspects, the parameters may be randomly generated to provide optimized security to the communications. In an example, the first meshnet device and the second meshnet device may privately negotiate a randomly generated symmetric key that is to be utilized by the first meshnet device and the second meshnet device for encrypting and decrypting data communicated via the meshnet connection. The randomly generated symmetric key may be determined based at least in part on any combination of the first public key, the second public key, and/or randomly generated numbers. Additionally, the first meshnet device and the second meshnet device may utilize a secure protocol (e.g., Wireguard, IP sec, etc.) to communicate the data via the meshnet connection.

Additionally, or alternatively, the first meshnet device and the second meshnet device may communicate with each other indirectly via, for example, a relay device (e.g., a relay server) to set up the meshnet connection. In an example, the first meshnet device may provide the first assigned public key to a relay server, which may store an association of the first assigned public key with the first meshnet device. In some aspects, the association may include an association between the first assigned public key and a first communication connection between the relay server and the first meshnet device. Similarly, the second meshnet device may provide the second assigned public key to the relay server, which may store an association of the second assigned public key with the second meshnet device. In some aspects, the association may include an association between the second assigned public key and a second communication connection between the relay server and the first meshnet device. The relay server may rely on the stored associations of public keys and client applications to determine a destination of a received message. In some aspects, the relay server may include a network of relay servers that enable the first meshnet device and the second meshnet device to communicate with each other. In this case, the first meshnet device and the second meshnet device may provide the respective assigned public keys to different relay servers included within the network of relay servers.

In some aspects, the first meshnet device may transmit, to the relay server, a first message that is to be delivered to the second meshnet device. Along with the first message, the first meshnet device may transmit the second assigned public key. Further, the first meshnet device may encrypt the first message utilizing the second assigned public key. In some aspects, the first meshnet device may encrypt the first message based at least in part on utilizing the negotiated randomly generated symmetric key. Based at least in part on receiving the encrypted first message and the second assigned public key, the relay server may determine from stored associations that the second assigned public key is associated with the second meshnet device. As a result, the relay server may determine that the first message is to be relayed (e.g., transmitted) to the second meshnet device. Similarly, the second meshnet device may transmit, to the relay server, a second message that is to be delivered to the first meshnet device. Along with the second message, the second meshnet device may transmit the first assigned public key. Further, the second meshnet device may encrypt the second message utilizing the first assigned public key. In some aspects, the second meshnet device may encrypt the second message based at least in part on utilizing the negotiated randomly generated symmetric key. Based at least in part on receiving the encrypted second message and the first assigned public key, the relay server may determine from stored associations that the first assigned public key is associated with the first meshnet device. As a result, the relay server may determine that the second message is to be relayed (e.g., transmitted) to the first meshnet device. In this way, the relay server may enable the first meshnet device and the second meshnet device to communicate with each other to set up the meshnet connection.

Based at least in part on establishing (e.g., setting up) the meshnet connection, the first meshnet device and the second meshnet device may begin communicating encrypted data via the meshnet connection based at least in part on utilizing the negotiated parameters and the secure protocol. In a similar and/or analogous manner, the first meshnet device may set up meshnet connections with a third client application installed in the third client application and with a fourth client application associated with the fourth client application. Also, in a similar and/or analogous manner, the second meshnet device may set up meshnet connections with the first meshnet device, the third client application, and the fourth client application. Further, in a similar and/or analogous manner, the third client application may set up meshnet connections with the first meshnet device, the second meshnet device, and the fourth client application. Finally, in a similar and/or analogous manner, the fourth client application may set up meshnet connections with the first meshnet device, the second meshnet device, and the third client application. Additional client applications that enter the mesh network may also set up meshnet connections with the other client applications included in the mesh network.

As shown by reference numeral 355, first meshnet device and/or the second meshnet device may enable partial access to the LAN. In an example, based at least in part on receiving the first communication information indicating that the second meshnet device has partial access to the LAN, the first meshnet device may store the first subnet IP address in a memory (e.g., memory 830) associated with the first meshnet device in correlation with the second meshnet device. This correlation may enable the first meshnet device to enable the second meshnet device to communicate with the first LAN device.

When the second meshnet device is to communicate with the first LAN device, the second meshnet device may determine a current subnet IP address currently assigned to the first LAN device. In one example, to determine the current subnet IP address, the second meshnet device may transmit a query to a DNS server associated with the LAN. In some aspects, information (e.g., DNS IP address) associated with accessing the DNS server may be communicated by the first meshnet device during establishment of the meshnet connection between the first meshnet device and the second meshnet device. The query may include identification information to identify the first LAN device and may request the DNS server to return the current subnet IP address assigned to the first LAN device. The identification information may include, for example, a name associated with the first LAN device, a function associated with the first LAN device, a make and/or model of the first LAN device, a public IP address and/or public port associated with the first LAN device, or a combination thereof.

The second meshnet device may utilize the DNS IP address to transmit the query to the DNS server associated with the LAN. Based at least in part on transmitting the query, the second meshnet device may receive, from the DNS server the current subnet IP address currently assigned to the first LAN device. In some aspects, the DNS server may be included natively within the first meshnet application. In this case, the first meshnet IP address may be utilized in place of the DNS IP address.

When the second meshnet device is to communicate with the first LAN device, the second meshnet device may select a meshnet device internal to (e.g., connected to) the LAN to communicate with the first LAN device. In some aspects, the second meshnet device may select the first meshnet device from among meshnet devices known to be internal to LANs. In this case, the second meshnet device may determine, for example, an initiation meshnet packet (or any packet) to be transmitted to the first meshnet device over the meshnet connection between the second meshnet device and the first meshnet device. The initiation meshnet packet may be encrypted and/or encapsulated based at least in part on utilizing the cryptographic key (e.g., block 350) negotiated between the second meshnet device and the first meshnet device.

In some aspects, an initiation meshnet header included in the initiation meshnet packet may indicate the second meshnet IP address as a source address to indicate that the initiation meshnet packet is transmitted by the second meshnet device. Further, the initiation meshnet header may indicate the subnet IP address of the first LAN device or the first meshnet IP address as a destination address to indicate that the initiation meshnet packet is to be received by the first meshnet device. In some aspects, the initiation meshnet header may indicate the first subnet IP address assigned to the first LAN device as the destination address to indicate to the first meshnet device that the first meshnet device is to transmit/forward the initiation network packet to the first LAN device.

In an initiation meshnet payload included in the initiation meshnet packet, the second meshnet device may include an initiation network packet to be transmitted to the first LAN device. The initiation network packet may include an initiation network header indicating the second meshnet IP address as the source address to indicate that the initiation network packet is transmitted by the second meshnet device.

Further, the initiation network header may indicate the first subnet IP address assigned to the first LAN device as the destination address to indicate that the initiation network packet is to be received by the first LAN device. The initiation network packet may also include an initiation network payload with information to be received by the first LAN device.

Based at least in part on receiving the encrypted initiation meshnet packet over the meshnet connection, the first meshnet device may utilize the negotiated cryptographic key to decrypt the encrypted initiation meshnet packet. The first meshnet device may determine, based at least in part on analyzing the initiation meshnet header, that the initiation meshnet packet is transmitted by the second meshnet device and is to be received by the first meshnet device. Further, based at least in part on analyzing the initiation meshnet header and/or payload, the first meshnet device may determine the initiation network header included in the initiation network packet.

The first meshnet device may determine the first subnet IP address as the destination address of the initiation network packet. In this case, the first meshnet device may determine that the second meshnet device wishes to communicate with a LAN device connected to the LAN. Because the first meshnet device is aware that the second meshnet device has partial access to the LAN, the first meshnet device may compare the determined first subnet IP address from the initiation network header with the stored first subnet IP address stored in correlation with the second meshnet device. When the determined first subnet IP address fails to match (e.g., is different from) the stored first subnet IP address, the first meshnet device may determine that the second meshnet device does not have access to transmit the initiation network packet to the first LAN device. In this case, the first meshnet device may discard the initiation network packet and may inform the second meshnet device of the same.

Alternatively, when the determined first subnet IP address matches (e.g., is the same as) the stored first subnet IP address, the first meshnet device may determine that the second meshnet device has access to transmit the initiation network packet to the first LAN device. In this case, the first meshnet device may determine that the first meshnet device is to transmit the initiation network packet to the first LAN device over a LAN connection between the first meshnet device and the first LAN device. The first meshnet device may determine, for example, a modified initiation network packet by modifying the initiation network header in the initiation network packet to indicate the subnet IP address assigned to the first meshnet device as the source address. Further, the first meshnet device may transmit the modified initiation network packet to the first LAN device over the LAN connection.

Based at least in part on transmitting the modified initiation network packet, the first meshnet device may receive a response network packet from the first LAN device. In some aspects, the first meshnet device may store one or more correlations associated with the tuple information (source address, destination address, etc.) included in transmitted and/or received packets for a given duration of time (e.g., 60 seconds, 120 seconds, 300 seconds, etc.) after transmitting the modified initiation network packet.

The response network packet may include a response network header indicating the first subnet IP address assigned to the first LAN device as the source address and indicating the subnet IP address assigned to the first meshnet device as the destination address. Further, the response network packet may include a response network payload along with information indicating that the response network payload is to be transmitted to the second meshnet device. In some aspects, the first meshnet device may determine that the response network payload is to be provided to the second meshnet device based at least in part on receiving the response network packet within the given duration of time.

In this case, the first meshnet device may determine a response meshnet packet including a response meshnet header indicating the first meshnet IP address of the first meshnet device as the source address and indicating the external meshnet IP address of the second meshnet device as the destination address. In some aspects, the response meshnet header may indicate the first subnet IP address assigned to the first LAN device as the source address to indicate to the external meshnet device that the response meshnet packet was transmitted by the first LAN device. The response meshnet packet may include a response meshnet payload including the response network payload received from the first LAN device. The first meshnet device may transmit the response meshnet packet to the second meshnet device over the meshnet connection between the first meshnet device and the second meshnet device. The response meshnet packet may be encrypted based at least in part on utilizing the cryptographic key (e.g., block 350) negotiated between the second meshnet device and the first meshnet device.

Based at least in part on receiving the encrypted response meshnet packet over the meshnet connection, the second meshnet device may utilize the negotiated cryptographic key to decrypt the encrypted response meshnet packet. The second meshnet device may determine, based at least in part on analyzing the response meshnet header, that the response meshnet packet is transmitted by the first meshnet device and is to be received by the second meshnet device. Further, based at least in part on analyzing the response meshnet header and/or payload, the second meshnet device may determine the response network header and the response network payload transmitted by the first LAN device via the first meshnet device. In this way, the first meshnet device may enable the second meshnet device, that is external to the LAN, to partially access (e.g., communicate with) the first LAN device that is internal to the first LAN.

In some aspects, the registering device may provide the MSP control infrastructure 104 with updated access information indicating that the second meshnet device has updated partial access to the LAN. The updated partial access may include, for example, a change in the one or more LAN devices with which the second meshnet device may communicate. In an example, the updated access information may include a second subnet IP address assigned to a second LAN device with which the second meshnet device may now communicate. In some aspects, the updated access information may also indicate a change in the first subnet IP address assigned to the first LAN device by the LAN. In an example, the updated access information may indicate that a different subnet IP address has been assigned to the first LAN device. Based at least in part on receiving the updated access information, the MSP control infrastructure may transmit updated first communication information to the first meshnet device, the updated first communication information including the updated access information. As a result, the first meshnet device may update the stored correlation to enable the second meshnet device to have updated partial access to the LAN.

In a similar and/or analogous manner as discussed above with respect to the first meshnet device enabling the second meshnet device (that is external to the LAN) to partially access only one or more LAN devices via the first meshnet device, the present disclosure contemplates the any given meshnet device that is internal to a given LAN enabling any external meshnet device that is external to the given LAN to partially access (e.g., communicate with) one or more given LAN devices via the given meshnet device. In this case, the given meshnet device may perform similar and/or analogous actions discussed above with respect to FIG. 3.

In this way, by enabling partial (or full) access to an external meshnet device, the first meshnet device may avoid difficulty and/or inefficiency in enabling the external meshnet device to have partial access to the LAN. As a result, efficient utilization of meshnet device resources (e.g., processing power, memory consumption, battery life, or the like) and meshnet and/or LAN resources (e.g., management resources, bandwidth, processing power, memory consumption, or the like) for performing suitable tasks associated with the mesh network and/or the LAN may be enabled without physical connection with the LAN. Also, a delay in communication between the external meshnet device and the one or more LAN devices may be avoided.

As indicated above, FIG. 3 is provided as an example. Other examples may differ from what is described with regard to FIG. 3.

FIG. 4 is an illustration of an example process 400 associated with enabling partial access to a LAN via a meshnet device, according to various aspects of the present disclosure. In some aspects, the process 400 may be performed by a memory and/or a processor/controller (e.g., processing unit 116, processor 820) associated with a first meshnet device (e.g., user device 102) running a client application. In some aspects, process 400 may be in a mesh network including the first meshnet device in communication with a second meshnet device, the first meshnet device being connected to a first local area network (LAN). As shown by reference numeral 410, process 400 may include receiving, by the first meshnet device from the second meshnet device via a meshnet connection between the first meshnet device and the second meshnet device, an initiation network packet to be transmitted by the first meshnet device to a first LAN device connected to the LAN, the initiation network packet indicating a first subnet IP address as a destination address. For instance, the first meshnet device may utilize an associated communication interface (e.g., communication interface 870) with the associated memory and/or processor to receive, from the second meshnet device via a meshnet connection between the first meshnet device and the second meshnet device, an initiation network packet to be transmitted by the first meshnet device to a first LAN device connected to the LAN, the initiation network packet indicating a first subnet IP address as a destination address, as discussed elsewhere herein.

As shown by reference numeral 420, process 400 may include comparing, by the first meshnet device, the first subnet IP address with a stored subnet IP address that is stored in a memory in correlation with the second meshnet device. For instance, the first meshnet device may utilize the associated memory and/or processor to compare the first subnet IP address with a stored subnet IP address that is stored in a memory in correlation with the second meshnet device, as discussed elsewhere herein.

As shown by reference numeral 430, process 400 may include selectively transmitting, by the first meshnet device, the initiation network packet to the first LAN device based at least in part on a result of comparing the first subnet IP address with the stored subnet IP address. For instance, the first meshnet device may utilize the associated communication interface, memory, and/or processor to selectively transmit the initiation network packet to the first LAN device based at least in part on a result of comparing the first subnet IP address with the stored subnet IP address, as discussed elsewhere herein.

Process 400 may include additional aspects, such as any single aspect or any combination of aspects described below and/or in connection with one or more other processes described elsewhere herein.

In a first aspect, in process 400, selectively transmitting the initiation network packet includes transmitting the initiation network packet to the first LAN device when the first subnet IP address matches the stored subnet IP address.

In a second aspect, alone or in combination with the first aspect, in process 400, selectively transmitting the initiation network packet includes refraining from transmitting the initiation network packet to the first LAN device when the first subnet IP address fails to match the stored up an IP address.

In a third aspect, alone or in combination with the first through second aspects, in process 400, selectively transmitting the initiation network packet includes modifying the initiation network packet to indicate a subnet IP address, that is assigned to the first meshnet device by the LAN, as a source address.

In a fourth aspect, alone or in combination with the first through third aspects, in process 400, selectively transmitting the initiation network packet includes transmitting the initiation network packet to the first LAN device over a LAN connection between the first meshnet device and the first LAN device.

In a fifth aspect, alone or in combination with the first through fourth aspects, in process 400, receiving the initiation network packet includes receiving the initiation network packet in a communication that is encrypted with a cryptographic key associated with the meshnet connection between the first meshnet device and the second meshnet device.

In a sixth aspect, alone or in combination with the first through fifth aspects, process 400 may include receiving a response network packet that is to be transmitted by the first meshnet device to the second meshnet device via the meshnet connection between the first meshnet device and the second meshnet device.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with enabling partial access to a LAN via a meshnet device, according to various aspects of the present disclosure. In some aspects, the process 500 may be performed by a memory and/or a processor/controller (e.g., processing unit 116, processor 720) associated with a user device/meshnet device (e.g., user device 102) running a client application. In some aspects, the process may be performed in a mesh network including a first meshnet device in communication with a second meshnet device in a mesh network, the first meshnet device being connected to a first local area network (LAN). As shown by reference numeral 510, process 500 may include receiving, by the first meshnet device from the second meshnet device via a meshnet connection between the first meshnet device and the second meshnet device, a first initiation network packet to be transmitted by the first meshnet device to a first LAN device connected to the LAN, the first initiation network packet indicating a first subnet IP address as a first destination address. For instance, the first meshnet device may utilize an associated communication interface (e.g., communication interface 870) with the associated memory and/or processor to receive, from the second meshnet device via a meshnet connection between the first meshnet device and the second meshnet device, a first initiation network packet to be transmitted by the first meshnet device to a first LAN device connected to the LAN, the first initiation network packet indicating a first subnet IP address as a first destination address, as discussed elsewhere herein.

As shown by reference numeral 520, process 500 may include selecting, by the first meshnet device, to transmit the first initiation network packet to the first LAN device based at least in part on the first initiation packet indicating the first subnet IP address as the first destination address. For instance, the first meshnet device may utilize the associated memory and/or processor to selecting to transmit the first initiation network packet to the first LAN device based at least in part on the first initiation packet indicating the first subnet IP address as the first destination address, as discussed elsewhere herein.

As shown by reference numeral 530, process 500 may include receiving, by the first meshnet device from the second meshnet device via the meshnet connection between the first meshnet device and the second meshnet device, a second initiation network packet to be transmitted by the first meshnet device to a second LAN device connected to the LAN, the second initiation network packet indicating a second subnet IP address as a second destination address. For instance, the first meshnet device may utilize the associated communication, memory, and/or processor to receive, from the second meshnet device via the meshnet connection between the first meshnet device and the second meshnet device, a second initiation network packet to be transmitted by the first meshnet device to a second LAN device connected to the LAN, the second initiation network packet indicating a second subnet IP address as a second destination address, as discussed elsewhere herein.

As shown by reference numeral 540, process 500 may include selecting, by the first meshnet device, to refrain from transmitting the second initiation network packet to the second LAN device based at least in part on the second initiation packet indicating the second subnet IP address as the second destination address. For instance, the first meshnet device may utilize the associated memory and/or processor to select to refrain from transmitting the second initiation network packet to the second LAN device based at least in part on the second initiation packet indicating the second subnet IP address as the second destination address, as discussed elsewhere herein.

Process 500 may include additional aspects, such as any single aspect or any combination of aspects described below and/or in connection with one or more other processes described elsewhere herein.

In a first aspect, in process 500, selecting to transmit the first initiation network packet to the first LAN device includes determining that the first subnet IP address matches a stored subnet IP address stored in the memory in correlation with the second meshnet device.

In a second aspect, alone or in combination with the first aspect, in process 500, selecting to refrain from transmitting the second initiation network packet to the second LAN device includes determining that the second subnet IP address fails to match a stored subnet IP address stored in the memory in correlation with the second meshnet device.

In a third aspect, alone or in combination with the first through second aspects, in process 500, selecting to transmit the first initiation network packet to the first LAN device includes modifying the first initiation network packet to indicate a subnet IP address, that is assigned to the first meshnet device by the LAN, as a source address.

In a fourth aspect, alone or in combination with the first through third aspects, in process 500, selecting to transmit the first initiation network packet to the first LAN device includes transmitting the first initiation network packet to the first LAN device over a first LAN connection between the first meshnet device and the first LAN device.

In a fifth aspect, alone or in combination with the first through fourth aspects, in process 500, receiving the first initiation network packet to the first LAN device includes receiving the first initiation network packet in a communication that is encrypted with a cryptographic key associated with the meshnet connection between the first meshnet device and the second meshnet device.

In a sixth aspect, alone or in combination with the first through fifth aspects, process 500 may include receiving, from the first LAN device, a response network packet that is to be transmitted by the first meshnet device to the second meshnet device via the meshnet connection between the first meshnet device and the second meshnet device.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with enabling partial access to a LAN via a meshnet device, according to various aspects of the present disclosure. In some aspects, the process 600 may be performed by a memory and/or a processor/controller (e.g., processing unit 110, processor 820) associated with an infrastructure device (e.g., MSP control infrastructure 104) capable of configuring client applications installed on user/meshnet devices. In some aspects, process 600 may be performed by the infrastructure device in a mesh network including a first meshnet device in communication with a second meshnet device, the first meshnet device being connected to a first local area network (LAN), the method comprising. As shown by reference numeral 610, process 600 may include configuring the first meshnet device to receive, from the second meshnet device via a meshnet connection between the first meshnet device and the second meshnet device, an initiation network packet to be transmitted by the first meshnet device to a first LAN device connected to the LAN, the initiation network packet indicating a first subnet IP address as a destination address. For instance, the infrastructure device may utilize the associated memory and/or processor to configure the first meshnet device to receive, from the second meshnet device via a meshnet connection between the first meshnet device and the second meshnet device, an initiation network packet to be transmitted by the first meshnet device to a first LAN device connected to the LAN, the initiation network packet indicating a first subnet IP address as a destination address, as discussed elsewhere herein.

As shown by reference numeral 620, process 600 may include configuring the first meshnet device to compare the first subnet IP address with a stored subnet IP address that is stored in the memory in correlation with the second meshnet device. For instance, the infrastructure device may utilize the associated memory and/or processor to configure the first meshnet device to compare the first subnet IP address with a stored subnet IP address that is stored in the memory in correlation with the second meshnet device, as discussed elsewhere herein.

As shown by reference numeral 630, process 600 may include configuring the first meshnet device to selectively transmit the initiation network packet to the first LAN device based at least in part on a result of comparing the first subnet IP address with the stored subnet IP address. For instance, the infrastructure device may utilize the associated memory and/or processor to configure the first meshnet device to selectively transmit the initiation network packet to the first LAN device based at least in part on a result of comparing the first subnet IP address with the stored subnet IP address, as discussed elsewhere herein.

Process 600 may include additional aspects, such as any single aspect or any combination of aspects described below and/or in connection with one or more other processes described elsewhere herein.

In a first aspect, in process 600, configuring the first meshnet device to selectively transmit the initiation network packet includes configuring the first meshnet device to transmit the initiation network packet to the first LAN device when the first subnet IP address matches the stored subnet IP address.

In a second aspect, alone or in combination with the first aspect, in process 600, configuring the first meshnet device to selectively transmit the initiation network packet includes configuring the first meshnet device to refrain from transmitting the initiation network packet to the first LAN device when the first subnet IP address fails to match the stored up an IP address.

In a third aspect, alone or in combination with the first through second aspects, in process 600, configuring the first meshnet device to selectively transmit the initiation network packet includes configuring the first meshnet device to modify the initiation network packet to indicate a subnet IP address, that is assigned to the first meshnet device by the LAN, as a source address.

In a fourth aspect, alone or in combination with the first through third aspects, in process 600, configuring the first meshnet device to selectively transmit the initiation network packet includes configuring the first meshnet device to transmit the initiation network packet to the first LAN device over a LAN connection between the first meshnet device and the first LAN device.

In a fifth aspect, alone or in combination with the first through fourth aspects, in process 600, configuring the first meshnet device to receive the initiation network packet includes configuring the first meshnet device to receive the initiation network packet in a communication that is encrypted with a cryptographic key associated with the meshnet connection between the first meshnet device and the second meshnet device.

In a sixth aspect, alone or in combination with the first through fifth aspects, process 600 may include configuring the first meshnet device to receive a response network packet that is to be transmitted by the first meshnet device to the second meshnet device via the meshnet connection between the first meshnet device and the second meshnet device.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of an example process 700 associated with enabling partial access to a LAN via a meshnet device, according to various aspects of the present disclosure. In some aspects, the process 700 may be performed by a memory and/or a processor/controller (e.g., processing unit 110, processor 720) associated with an infrastructure device (e.g., MSP control infrastructure 104) capable of configuring client applications installed on user/meshnet devices. In some aspects, process 700 may be performed by the infrastructure device in a mesh network including a first meshnet device in communication with a second meshnet device, the first meshnet device being connected to a first local area network (LAN). As shown by reference numeral 710, process 700 may include configuring the first meshnet device to receive, from the second meshnet device via a meshnet connection between the first meshnet device and the second meshnet device, a first initiation network packet to be transmitted by the first meshnet device to a first LAN device connected to the LAN, the first initiation network packet indicating a first subnet IP address as a first destination address. For instance, the infrastructure device may utilize the associated memory and/or processor to configure the first meshnet device to receive, from the second meshnet device via a meshnet connection between the first meshnet device and the second meshnet device, a first initiation network packet to be transmitted by the first meshnet device to a first LAN device connected to the LAN, the first initiation network packet indicating a first subnet IP address as a first destination address, as discussed elsewhere herein.

As shown by reference numeral 720, process 700 may include configuring the first meshnet device to select to transmit the first initiation network packet to the first LAN device based at least in part on the first initiation packet indicating the first subnet IP address as the first destination address. For instance, the infrastructure device may utilize the associated memory and/or processor to configure the first meshnet device to select to transmit the first initiation network packet to the first LAN device based at least in part on the first initiation packet indicating the first subnet IP address as the first destination address, as discussed elsewhere herein.

As shown by reference numeral 730, process 700 may include configuring the first meshnet device to receive, from the second meshnet device via the meshnet connection between the first meshnet device and the second meshnet device, a second initiation network packet to be transmitted by the first meshnet device to a second LAN device connected to the LAN, the second initiation network packet indicating a second subnet IP address as a second destination address. For instance, the infrastructure device may utilize the associated memory and/or processor to configure the first meshnet device to receive, from the second meshnet device via the meshnet connection between the first meshnet device and the second meshnet device, a second initiation network packet to be transmitted by the first meshnet device to a second LAN device connected to the LAN, the second initiation network packet indicating a second subnet IP address as a second destination address, as discussed elsewhere herein.

As shown by reference numeral 740, process 700 may include configuring the first meshnet device to select to refrain from transmitting the second initiation network packet to the second LAN device based at least in part on the second initiation packet indicating the second subnet IP address as the second destination address. For instance, the infrastructure device may utilize the associated memory and/or processor to configure the first meshnet device to select to refrain from transmitting the second initiation network packet to the second LAN device based at least in part on the second initiation packet indicating the second subnet IP address as the second destination address, as discussed elsewhere herein.

Process 700 may include additional aspects, such as any single aspect or any combination of aspects described below and/or in connection with one or more other processes described elsewhere herein.

In a first aspect, in process 700, configuring the first meshnet device to select to transmit the first initiation network packet to the first LAN device includes configuring the first meshnet device to determine that the first subnet IP address matches a stored subnet IP address stored in the memory in correlation with the second meshnet device.

In a second aspect, alone or in combination with the first aspect, in process 700, configuring the first meshnet device to select to refrain from transmitting the second initiation network packet to the second LAN device includes configuring the first meshnet device to determine that the second subnet IP address fails to match a stored subnet IP address stored in the memory in correlation with the second meshnet device.

In a third aspect, alone or in combination with the first through second aspects, in process 700, configuring the first meshnet device to select to transmit the first initiation network packet to the first LAN device includes configuring the first meshnet device to modify the first initiation network packet to indicate a subnet IP address, that is assigned to the first meshnet device by the LAN, as a source address.

In a fourth aspect, alone or in combination with the first through third aspects, in process 700, configuring the first meshnet device to select to transmit the first initiation network packet to the first LAN device includes configuring the first meshnet device to transmit the first initiation network packet to the first LAN device over a first LAN connection between the first meshnet device and the first LAN device.

In a fifth aspect, alone or in combination with the first through fourth aspects, in process 700, configuring the first meshnet device to receive the first initiation network packet to the first LAN device includes configuring the first meshnet device to receive the first initiation network packet in a communication that is encrypted with a cryptographic key associated with the meshnet connection between the first meshnet device and the second meshnet device.

In a sixth aspect, alone or in combination with the first through fifth aspects, process 700 may include configuring the first meshnet device to receive, from the first LAN device, a response network packet that is to be transmitted by the first meshnet device to the second meshnet device via the meshnet connection between the first meshnet device and the second meshnet device.

Although FIG. 7 shows example blocks of the process, in some aspects, the process may include additional blocks, fewer blocks, different blocks, or differently arranged blocks than those depicted in FIG. 7. Additionally, or alternatively, two or more of the blocks of the process may be performed in parallel.

As indicated above, FIG. 7 is provided as an example. Other examples may differ from what is described with regard to FIG. 7.

FIG. 8 is an illustration of example devices 800 associated with enabling partial access to a LAN via a meshnet device, according to various aspects of the present disclosure. In some aspects, the example devices 800 may form part of or implement the systems, servers, environments, infrastructures, components, devices, or the like described elsewhere herein (e.g., MSP control infrastructure, VPN server, etc.) and may be used to perform example processes described elsewhere herein. The example devices 800 may include a universal bus 810 communicatively coupling a processor 820, a memory 830, a storage component 840, an input component 850, an output component 860, and a communication interface 870.

Bus 810 may include a component that permits communication among multiple components of a device 800. Processor 820 may be implemented in hardware, firmware, and/or a combination of hardware and software. Processor 820 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 820 may include one or more processors capable of being programmed to perform a function. Memory 830 may include a random access memory (RAM), a read only memory (ROM), and/or another type of dynamic or static storage device (e.g., a flash memory, a magnetic memory, and/or an optical memory) that stores information and/or instructions for use by processor 820.

Storage component 840 may store information and/or software related to the operation and use of a device 800. For example, storage component 840 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 850 may include a component that permits a device 800 to receive information, such as via user input (e.g., a touch screen display, a keyboard, a keypad, a mouse, a button, a switch, and/or a microphone). Additionally, or alternatively, input component 850 may include a component for determining location (e.g., a global positioning system (GPS) component) and/or a sensor (e.g., an accelerometer, a gyroscope, an actuator, another type of positional or environmental sensor, and/or the like). Output component 860 may include a component that provides output information from device 800 (via, for example, a display, a speaker, a haptic feedback component, an audio or visual indicator, and/or the like).

Communication interface 870 may include a transceiver-like component (e.g., a transceiver, a separate receiver, a separate transmitter, and/or the like) that enables a device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, and/or the like.

A device 800 may perform one or more processes described elsewhere herein. A device 800 may perform these processes based on processor 820 executing software instructions stored by a non-transitory computer-readable medium, such as memory 830 and/or storage component 840. As used herein, the term "computer-readable medium" may refer to a non-transitory memory device. A memory device may include memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 8 are provided as an example. In practice, a device 800 may include additional components, fewer components, different components, or differently arranged components than those shown in FIG. 8. Additionally, or alternatively, a set of components (e.g., one or more components) of a device 800 may perform one or more functions described as being performed by another set of components of a device 800.

As indicated above, FIG. 8 is provided as an example. Other examples may differ from what is described with regard to FIG. 8.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first meshnet device in communication with a second meshnet device in a mesh network, the first meshnet device being connected to a local area network (LAN) and comprising:

a memory; and a processor communicatively coupled to the memory, the memory and the processor being configured to:

receive, from the second meshnet device via a meshnet connection between the first meshnet device and the second meshnet device, an initiation network packet to be transmitted by the first meshnet device to a first LAN device connected to the LAN, the initiation network packet indicating a first subnet IP address as a destination address;

compare the first subnet IP address with a stored subnet IP address that is stored in the memory in correlation with the second meshnet device, the correlation indicating whether the second meshnet device may access the first LAN device; and selectively transmit the initiation network packet to the first LAN device based at least in part on a result of comparing the first subnet IP address with the stored subnet IP address.

2. The first meshnet device of claim 1, wherein, to selectively transmit the initiation network packet, the memory and the processor are configured to transmit the initiation network packet to the first LAN device when the first subnet IP address matches the stored subnet IP address.

3. The first meshnet device of claim 1, wherein, to selectively transmit the initiation network packet, the memory and the processor are configured to refrain from transmitting the initiation network packet to the first LAN device when the first subnet IP address fails to match the stored subnet IP address.

4. The first meshnet device of claim 1, wherein, to selectively transmit the initiation network packet, the memory and the processor are configured to modify the initiation network packet to indicate a subnet IP address, that is assigned to the first meshnet device by the LAN, as a source address.

5. The first meshnet device of claim 1, wherein, to selectively transmit the initiation network packet, the memory and the processor are configured to transmit the initiation network packet to the first LAN device over a LAN connection between the first meshnet device and the first LAN device.

6. The first meshnet device of claim 1, wherein, to receive the initiation network packet, the memory and the processor are configured to receive the initiation network packet in a communication that is encrypted with a cryptographic key associated with the meshnet connection between the first meshnet device and the second meshnet device.

7. The first meshnet device of claim 1, wherein the memory and the processor are configured to:
receive, from the first LAN device, a response network packet that is to be transmitted by the first meshnet device to the second meshnet device via the meshnet connection between the first meshnet device and the second meshnet device.

8. A method in a mesh network including a first meshnet device in communication with a second meshnet device, the first meshnet device being connected to a first local area network (LAN), the method comprising:
receiving, by the first meshnet device from the second meshnet device via a meshnet connection between the first meshnet device and the second meshnet device, an initiation network packet to be transmitted by the first meshnet device to a first LAN device connected to the LAN, the initiation network packet indicating a first subnet IP address as a destination address;
comparing, by the first meshnet device, the first subnet IP address with a stored subnet IP address that is stored in a memory in correlation with the second meshnet device, the correlation indicating whether the second meshnet device may access the first LAN device; and
selectively transmitting, by the first meshnet device, the initiation network packet to the first LAN device based at least in part on a result of comparing the first subnet IP address with the stored subnet IP address.

9. The method of claim 8, wherein selectively transmitting the initiation network packet includes transmitting the initiation network packet to the first LAN device when the first subnet IP address matches the stored subnet IP address.

10. The method of claim 8, wherein selectively transmitting the initiation network packet includes refraining from transmitting the initiation network packet to the first LAN device when the first subnet IP address fails to match the stored up an IP address.

11. The method of claim 8, wherein selectively transmitting the initiation network packet includes modifying the initiation network packet to indicate a subnet IP address, that is assigned to the first meshnet device by the LAN, as a source address.

12. The method of claim 8, wherein selectively transmitting the initiation network packet includes transmitting the initiation network packet to the first LAN device over a LAN connection between the first meshnet device and the first LAN device.

13. The method of claim 8, wherein receiving the initiation network packet includes receiving the initiation network packet in a communication that is encrypted with a cryptographic key associated with the meshnet connection between the first meshnet device and the second meshnet device.

14. The method of claim 8, further comprising:
receiving a response network packet that is to be transmitted by the first meshnet device to the second meshnet device via the meshnet connection between the first meshnet device and the second meshnet device.

15. A non-transitory computer-readable medium configured to store instructions, which when executed by a processor associated with a first meshnet device in communication with a second meshnet device in a mesh network, the first meshnet device being connected to a first local area network (LAN), configure the processor to:
receive, from the second meshnet device via a meshnet connection between the first meshnet device and the second meshnet device, an initiation network packet to be transmitted by the first meshnet device to a first LAN device connected to the LAN, the initiation network packet indicating a first subnet IP address as a destination address;
compare the first subnet IP address with a stored subnet IP address that is stored in the memory in correlation with the second meshnet device, the correlation indicating whether the second meshnet device may access the first LAN device; and
selectively transmit the initiation network packet to the first LAN device based at least in part on a result of comparing the first subnet IP address with the stored subnet IP address.

16. The non-transitory computer-readable medium of claim 15, wherein, to selectively transmit the initiation network packet, the processor is configured to transmit the initiation network packet to the first LAN device when the first subnet IP address matches the stored subnet IP address.

17. The non-transitory computer-readable medium of claim 15, wherein, to selectively transmit the initiation network packet, the processor is configured to refrain from transmitting the initiation network packet to the first LAN device when the first subnet IP address fails to match the stored subnet IP address.

18. The non-transitory computer-readable medium of claim 15, wherein, to selectively transmit the initiation network packet, the processor is configured to modify the initiation network packet to indicate a subnet IP address, that is assigned to the first meshnet device by the LAN, as a source address.

19. The non-transitory computer-readable medium of claim 15, wherein, to selectively transmit the initiation network packet, the processor is configured to transmit the initiation network packet to the first LAN device over a LAN connection between the first meshnet device and the first LAN device.

20. The non-transitory computer-readable medium of claim 15, wherein, to receive the initiation network packet, the processor is configured to receive the initiation network packet in a communication that is encrypted with a cryptographic key associated with the meshnet connection between the first meshnet device and the second meshnet device.

* * * * *